US010911435B2

(12) United States Patent
Thakore et al.

(10) Patent No.: US 10,911,435 B2
(45) Date of Patent: Feb. 2, 2021

(54) DTCP CERTIFICATE AUTHENTICATION OVER TLS PROTOCOL

(71) Applicant: Cable Television Laboratories, Inc., Louisville, CO (US)

(72) Inventors: Darshak Thakore, Broomfield, CO (US); Stuart Hoggan, Longmont, CO (US); Dave Belt, Morrison, CO (US); Amol Bhagwat, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 107 days.

(21) Appl. No.: 15/942,825

(22) Filed: Apr. 2, 2018

(65) Prior Publication Data

US 2018/0227294 A1  Aug. 9, 2018

Related U.S. Application Data

(63) Continuation of application No. 14/953,543, filed on Nov. 30, 2015, now Pat. No. 9,935,938, which is a continuation of application No. 13/798,290, filed on Mar. 13, 2013, now Pat. No. 9,203,832.

(60) Provisional application No. 61/778,187, filed on Mar. 12, 2013.

(51) Int. Cl.
  *H04L 29/06* (2006.01)
  *H04L 9/08* (2006.01)
(52) U.S. Cl.
  CPC ........ *H04L 63/0823* (2013.01); *H04L 63/029* (2013.01); *H04L 63/0428* (2013.01); *H04L 63/06* (2013.01); *H04L 63/0869* (2013.01); *H04L 63/12* (2013.01); *H04L 63/166* (2013.01); *H04L 9/0841* (2013.01)

(58) Field of Classification Search
  CPC ............ H04L 63/0823; H04L 63/0428; H04L 63/06; H04L 63/12; H04L 63/166; H04L 9/0841
  See application file for complete search history.

(56) References Cited

U.S. PATENT DOCUMENTS

| 4,200,770 A | 4/1980 | Stanford |
| 6,584,567 B1 * | 6/2003 | Bellwood ........... H04L 63/0464 |
| | | 713/171 |
| 2002/0007452 A1 * | 1/2002 | Traw ...................... G06F 21/10 |
| | | 713/152 |

(Continued)

OTHER PUBLICATIONS

M. Brown, et al. (Brown), "Transport Layer Security (TLS) Authorization Extensions," IETF, RFC: 5878, May 2010. (Year: 2010).*

(Continued)

*Primary Examiner* — Robert B Leung
(74) *Attorney, Agent, or Firm* — Great Lakes Intellectual Property, PLLC

(57) ABSTRACT

Authenticating devices utilizing Transport Layer Security (TLS) protocol to facilitate exchange of authentication information or other data to permit or otherwise enable access to services requiring authentication credentials, certificates, tokens or other information. The authentication may utilize Digital Transmission Content Protection (DTCP) certificates, Diffie-Hellman (DH) parameters or other information available to the authenticating devices, optionally without requiring device requesting authentication to obtain an X.509 certificate.

19 Claims, 3 Drawing Sheets

(56) References Cited

U.S. PATENT DOCUMENTS

| | | |
|---|---|---|
| 2003/0228015 A1 | 12/2003 | Yuichi |
| 2005/0097362 A1 | 5/2005 | Winget |
| 2006/0274899 A1 | 12/2006 | Zhu et al. |
| 2010/0268955 A1 | 10/2010 | Chiyo |
| 2012/0124678 A1 | 5/2012 | Shintani et al. |
| 2012/0151570 A1 | 6/2012 | Cooppan et al. |

OTHER PUBLICATIONS

T. Dierks and E. Rescorla, "The Transport Layer Security (TLS) Protocol," Version 1.2, RFC 5246, Aug. 2008. (Year: 2008).*

Armknecht, Frederik, et al. "An efficient implementation of trusted channels based on OpenSSL." Proceedings of the 3rd ACM workshop on Scalable trusted computing. ACM, 2008. (Year: 2008).*

M. Brown and R. Housley, "Transport Security (TLS) Authorization Extensions," RFC 5878, May 2010.

S. Black-Wilson, et al. "Transport Layer Security (TLS) Extensions," RFC 4366, Apr. 2006.

Digital Transmission Licensing Administrator (DTLA), "Digital Transmission Content Protection Specification," vol. 1 (Informational Version), Revision 1.7, Dec. 14, 2011.

Santesson, "TLS Handshake Message for Supplemental Data," RFC 4680, Sep. 2006.

T. Dierks and E. Rescorla, "The Transport Layer Security (TLS) Protocol," Version 1.2, RFC 5246, Aug. 2008.

H. Tian, Y. Wang, "Security Analysis of the Digital Transmission Copy Protection Specification," Security and Management Conference, pp. 134-137, 2006.

\* cited by examiner

DTCP CERTIFICATE AUTHENTICATION OVER TLS PROTOCOL

CROSS-REFERENCE TO RELATED APPLICATIONS

This is a continuation of U.S. application Ser. No. 14/953,543 filed Nov. 30, 2015, which in turn is a continuation of U.S. application Ser. No. 13/798,290 filed Mar. 13, 2013, which in turn claims the benefit of U.S. provisional application No. 61/778,187 filed Mar. 12, 2013, the disclosures of which are incorporated in their entireties by reference herein.

TECHNICAL FIELD

The present invention relates to utilizing Transport Layer Security (TLS) protocol to facilitate Digital Transmission Content Protection (DTCP) certificate based authentication, such as but not necessary limited to facilitating establishment of a TLS tunnel between applications, services, devices, etc. through mutual authentication.

BACKGROUND

The Internet Engineering Task Force (IETF) publishes various Request For Comments (RFCs). RFCs 2246, 4346 and 5246, the disclosures of which are hereby incorporated by reference in their entireties, relate to a Transport Layer Security (TLS) protocol. It states that the primary goal of the TLS protocol is to provide privacy and data integrity between two communicating applications. RFC 4680, the disclosure of which is hereby incorporated by reference in its entirety, builds on RFCs 4346 and 5246 to allow a client and/or a server to exchange SupplementalData messages in order to exchange information for decision making purposes. RFC 5878, the disclosure of which is hereby incorporated by reference in its entirety, relates to the use of TLS authorization extensions to specify certain authorization formats authorized to be transport using SupplementalData message.

RFC 5878 defines the use of an X.509 attribute certificate (AC) and an assertion composed using the Security Assertion Markup Language (SAML) as acceptable authorization formats. The use of these authorization formats limits the devices that can be authenticated to those in possession of X.509, X.509 AC or SAML certificates. The present invention contemplates a need to facilitate authentication of devices where both devices may not meet the authorization format restrictions associated with RFC 5878.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
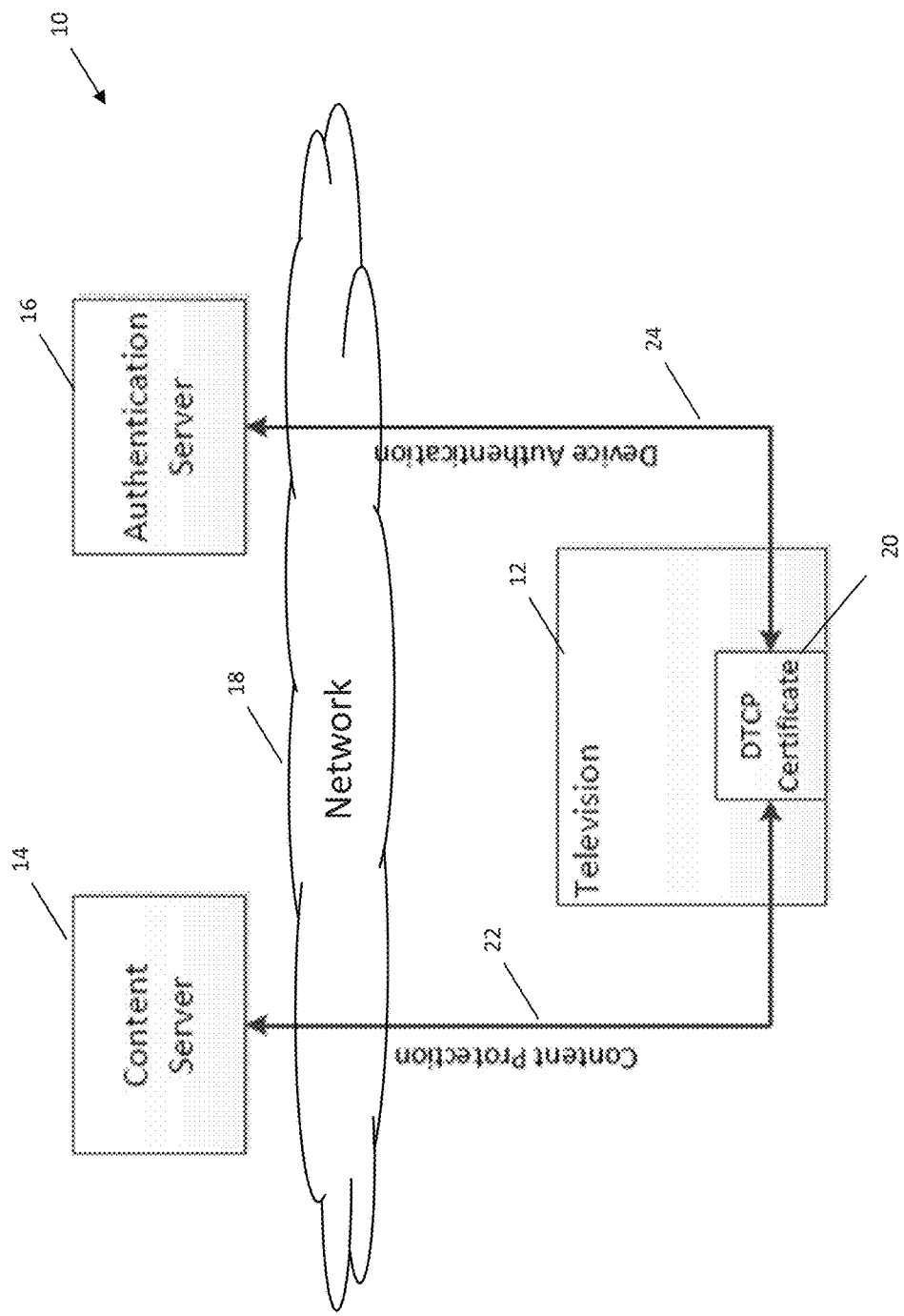
FIG. 1 illustrates an authentication system in accordance with one non-limiting aspect of the present invention.

FIG. 1 illustrates an authentication system 10 in accordance with one non-limiting aspect of the present invention. The system 10 is shown to include a television 12 operable to interface signaling with a content server 14 and an authentication server 16. The television 12 and the authentication server 16 may exchange signaling with the television over a network 18. The content server 14 may be configured to facilitate interfacing content related signaling with the television 12. The authentication server 16 may be configured to facilitate interfacing authorization related signaling with the television 12, such as according to Transport Layer Security (TLS) protocol and the like. The television 12 may be provided with a Digital Transmission Content Protection (DTCP) certificate 20 issued for link protection over various types of links, like DTCP over IP, and as described in Digital Transmission Content Protection Specification Volume 1, revision 1.7, and DTCP Volume 1 Supplement E Mapping DTCP to IP, revision 1.4, as published by Digital Transmission Licensing Administrator (DTLA), the disclosures of which are hereby incorporated by reference in their entireties. As described below in more detail, the DTCP certificate 20 may be used in accordance with the present invention to facilitate authentication of the television using TLS.

The DTCP certificate 20 may be provided to the television 12 for storage within a computer-readable medium (not shown) by a service provider (not shown) associated with the content server 14, a provider or manufacture of the television, a certificate issuing authority or the like. The content server 14 and/or an associated service provider (not shown) may be configured to facilitate interfacing various types of content with the television 12 and is shown and described for exemplary non-limiting purposes with respect to facilitating television related signaling. This is done without intending to limit the scope and contemplation of the present invention as the present invention fully contemplates the television 12 being configured to facilitate interfacing virtually any type of content available from the content server 14. Optionally, the sourced content may require use of the DTCP certificate 20 to ensure link protection of a link 22 established between the television 12 and the content sever 14 over the network 18. The television 12 may include a TLS agent, a tuner, a network interface or other devices (not shown) sufficient to facilitate exchanging signaling over the network 18 with the content server 14, the authentication server 16 or other non-illustrated devices in communication with the network 18.

The television 12 is illustrated for exemplary non-limiting purposes to demonstrate the use of the present invention with respect to one environment where DTCP certificates 20 may be employed in the absence of X.509 AC and/or SAML certificates. There may be numerous televisions 12 deployed and/or to be deployed with DTCP certificates 20 or that will otherwise acquire one or more DTCP certificates 20 and that which may not necessarily acquire or be required to obtain X.509 AC and/or SAML certificates. These televisions 12 may require authentication with the authentication server 16 in order to access content from the content server 14, to enable certain operations on the television 12 and/or to facilitate data exchange necessary for other verification operations, such as to obtain a token or other certificate from the authentication server 16 for use in acquiring services. While the television 12 is one example of a device that may not possess or be required to utilize X.509 AC and/or SAML certificates, the present invention fully contemplates its use with devices 12 other than televisions that may similarly operate without requiring use of X.509 AC and/or SAML certificates. The present invention is not necessary limited to authenticating devices 12 that are not in possession of X.509 AC and/or SAML certificates as the operations contemplated herein may also be beneficial for use in authenticating such devices using X.509 and/or SAML certificates.

The contemplated authentication may be facilitated with construction of a TLS tunnel 24. The TLS tunnel 24 may be used to exchange information between the television 12 and the authentication server 16 needed to implement the desired authentication. The exchanged information may vary depending on the content, token, entitlement, etc. for which authentication is desired. The authentication server 16 is shown to be a standalone device but it may be associated with or part of other systems and devices for which authentication may be desired. The television 12 is shown to be communicating with a single content server 14 and single authentication server 16 for exemplary non-limiting purposes as the television 12 may be configured to facilitate communication with any number of additional devices, which themselves may include content server 14 and/or authentication server 16 capabilities and devices similar to those illustrated in FIG. 1. The television 12 may be configured to facilitate the contemplated authentication with multiple authentication severs 16 and/or to establish multiple, optionally simultaneous, TLS tunnels 24 with the same or different content/authentication servers 14, 16 depending on the television services being desired for access.

The television 12 is shown to be a standalone device having capabilities sufficient to facilitate interfacing content with a user for exemplary purposes as the television 12 may be integrated with other devices and/or the capabilities represented or associated with the illustrated television 12 may be integrated or otherwise incorporated with other devices. The television 12 may include a processor (not shown) capable of executing non-transitory instructions stored in the computer-readable medium, or a computer program product, to facilitate the contemplated authentication and/or to facilitate operations associated with accessing and interfacing the desired content. The television 12 may include or be associated with a settop box (STB), a media terminal adapter (MTA), a computer, a mobile phone, a tablet, a router, a gateway or other device capable of interfacing signaling. The television 12 may include interfaces sufficient to facilitate wireless and/or wireline signaling to facilitate communications over the network 18. The network 18 and/or the television 12 may be configured to support various types of signaling (Quadrature Amplitude Modulation (QAM), Orthogonal Frequency Division Multiplex (OFDM), Code Division Multiple Access (CDMA), Time Division Multiplex (TDM), etc.), signaling carried over various types of mediums, such as but not necessarily limited to wireline, wireless (Wi-Fi, Wi-Max, Zigbee, cellular, radio frequency (RF), etc.), optical, coaxial cable, hybrid-fiber cable communication mediums, and various signaling protocols (Internet protocol (IP), Moving Pictures Expert Group (MPG), etc.).

The television 12 and/or devices connected to or otherwise associated with the television 12 may be configured to facilitate access to various services associated with different types of service providers. The contemplated authentication may be useful in controlling or otherwise authenticating access to such services and/or the servers and devices controlling access thereto. The present invention contemplates facilitating authentication with various types of service providers and their related services, including those associated with a multiple system operator (MSO), an Internet Service Provider (ISP), television service provider (broadcast, cable, satellite, Internet), a cellular service provider, a media/content streaming service provider and others. Advantageously, the ability of the present invention to facilitate authentication using the DTCP certificate 20 associated with the television 12 may be beneficial in allowing authentication with these various types of service providers without necessarily requiring the service providers to provide the device 12 requiring authentication X.509 AC and/or SAML certificates or other types of certificates/entitlements if such service providers accept authentication derived from the DTCP certificate 20. The contemplated authentication capabilities may be particularly beneficial with televisions 12 and other devices that may already include the DTCP certificate or that require the DTCP certificate for services.

Figure 2:
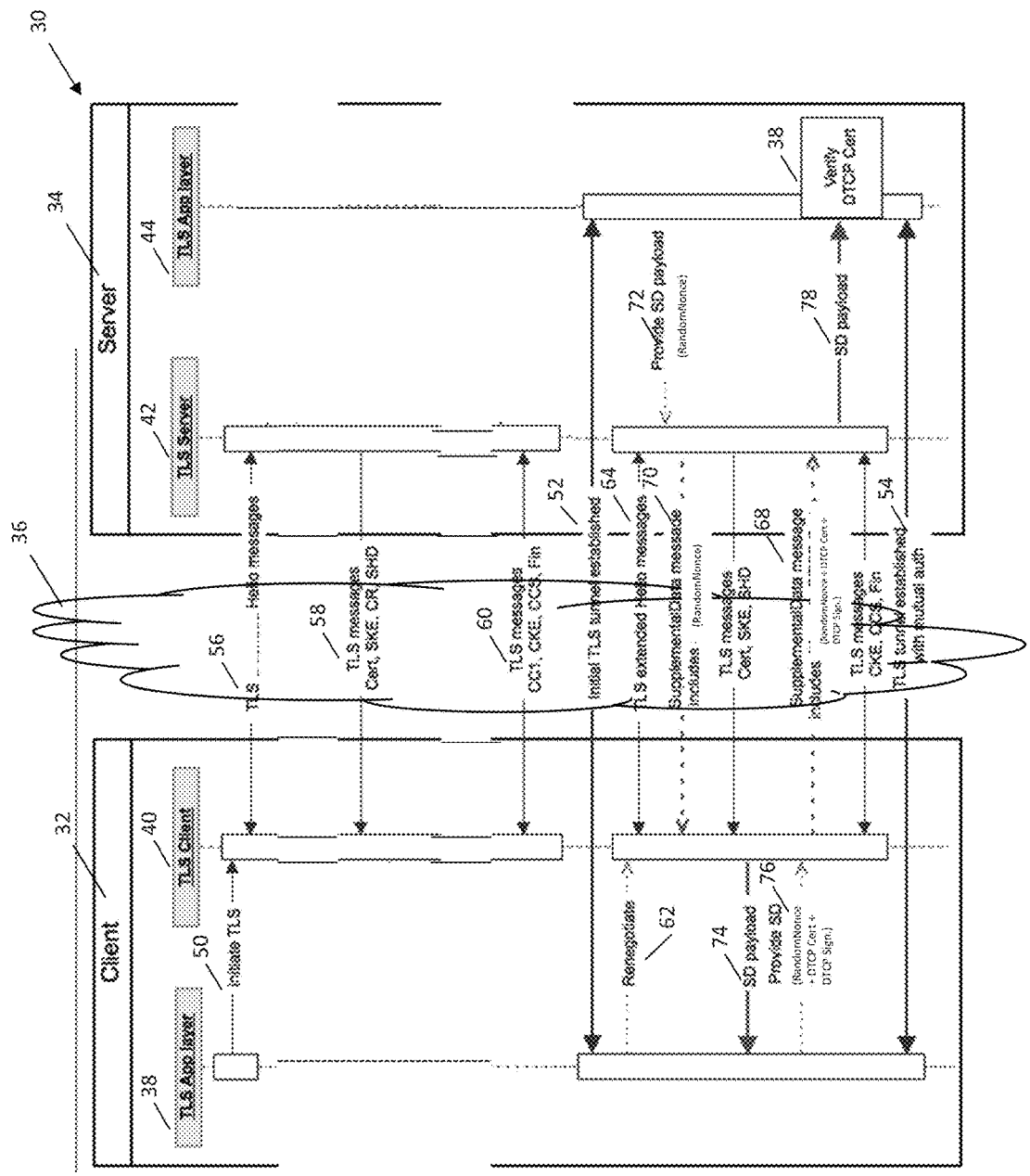
FIG. 2 illustrates a flowchart of a DTCP-based method for authentication in accordance with one non-limiting aspect of the present invention.

FIG. 2 illustrates a flowchart 30 of a method for authentication in accordance with one non-limiting aspect of the present invention. The method is described for exemplary non-limiting purposes with respect to facilitating authentication of the television with the authentication server illustrated in FIG. 1. The described authentication is not necessary limited to televisions as similar processes may be beneficial in facilitating authentication of other types of devices having a DTCP certificate or other parameters sufficient to facilitate the operations described herein. The method described with respect to FIG. 2 may be characterized as a DTCP-based authentication process at least in so far as the DTCP certificate, as opposed to an X.509 or SAML certificate, is relied upon to facilitate the authentication. The present invention is not necessary limited to facilitating authentication using DTCP certificates and contemplates the use of other parameters, such as with the use of a Diffie-Hellman (DH) parameter and/or random secrets, the use of which is described below in more detail with respect to FIG. 3.

The reliance on DTCP certificates may be particularly beneficial in facilitating authentication of the television or other type of device manufactured with a DTCP certificate or otherwise already in possession of a DTCP. The method of FIG. 2 is described with respect to a client 32 sending a DTCP certificate to a server 34 and/or another entity in an attempt to authenticate itself. The client 32 may correspond with the television 12 or other device desiring authentication, the server 34 may correspond with the authentication server 16 or other device having similar capabilities. The use of client 32 and the server 34 is not necessary intended to limit the scope and contemplation of the present invention and/or to necessarily define a hierarchical relationship or to infer other relationships between the authentication requesting device (i.e., the client/television) and the authenticating device (i.e., the server/authentication server). The client 32 and the server 34 are shown to be independent entities configured to facilitate communications over a network 36, however, the authentication may occur without requiring network-based communications, such as if the client 32 and the server 34 are included on the same device or otherwise positioned to facilitate communications without reliance on the network 36.

The client 32 may include a client TLS application layer 38 and a TLS client 40. The client TLS application layer 38 may be configured to facilitate interfacing TLS related messaging and signaling with other layers and/or devices associated with the client 32. The TLS client 40 may be configured to facilitate interfacing messaging and signaling with a server TLS server 42 associated with the server 34. The server 34 may include a TLS application layer 44 to facilitate interfacing messaging and signaling with other layers and/or devices associated with the server 34. The client TLS application layer 38, the TLS client 40, the TLS server 42 and the server TLS application layer 44 may be configured to facilitate TLS related messaging and signaling according to the parameters described in the above-identified TLS RFCs.

The client TLS application layer 38 may be configured to initiate authentication in response to an authentication request. The authentication request may be generated by the client 32 in response to operational inputs, such as in response to a user navigating a graphical user interface (GUI), electronic programming guide (EPG), Web browser or other human-machine interface (HMI) to gain access to content and/or in response to automated or computer-driven operations of the client 32 or device associated with the client, such as in response to an application program request. The client TLS application layer 38 may issue an Initiate TLS message 50 to the TLS client 40. The Initiate TLS message 50 may be transmitted through an operating system interface (OSI), application program interface (API) or other suitable means to the TLS client 40. The TLS client 40 may then undertake a TLS handshake operation with the TLS server 42. The TLS server 42 may be identified as a function of information included with in the authentication request or information otherwise made available to the TLS client 40.

The authentication method illustrated in FIG. 2 may be characterized as a double-handshake configuration at least in that a first TLS tunnel 52 is established between the client TLS application layer 38 and the server TLS application layer 44 and a second TLS tunnel 54 is established between the client TLS application layer 38 and the server TLS application layer 44 after additional message exchanges. The double-handshake process may be advantageous in cases where authorization data, SupplementalData or other information is sensitive as the double handshake technique can be used to provide additional protection. Establishment of the first TLS tunnel 52 may correspond with the TLS client 40 and the TLS server 42 exchanging TLS Hello messages 56, which may be referred to as non-extended Hello messages since the corresponding messages may not identify the use of SupplementalData messages defined in RFC 4680. The TLS hello messages 56 may be used to agree upon security parameters for the first TLS tunnel 52, which may include a first set of server TLS messages 58 being transmitted to the TLS client 40 and a second set of client TLS messages 60 being transmitted to the TLS server 42.

These TLS messages 58, 60 may be exchanged as part of the initial TLS handshake operation. The messages originating from the TLS server 42 are shown to correspond with a Certificate message (Cert), a ServerKeyExchange (SKE) message, a CertificateRequest (CR) message, and a ServerHelloDone (SHD) message as defined according to standard TLS protocol requirements in RFC 5246. The messages originating from the TLS client 40 are shown to correspond with a ClientCertificate message (CC1), a ClienKeyExchange message (CKE), a ChangeCipherSpec (CCS) message and a Finished message (Fin) as defined according to standard TLS protocol requirements in RFC 5246. The server Certificate message may be used to transmit a sever X.509 certificate to the TLS client 40. The messages 58, 60 may be periodically referenced herein with a "client" or a "server" adjective to represent the message source, i.e., the corresponding message originating from the client or the server.

The client TLS application layer 38 and the server TLS application layer 42 may rely upon the parameters exchanged in the messages 58, 60 to facilitate creation of the first TLS tunnel 52. The first TLS tunnel 52 may be beneficial in allowing the client 32 and the server 34 to exchange additional message in a secure manner. While the authentication method of FIG. 2 is described with respect to use of the first TLS tunnel 52, the present invention is not necessarily so limited and fully contemplates facilitating the additional authentication described below without use of the first TLS tunnel 52. In the double handshake, i.e., after establishing the first TLS tunnel 52, an additional handshake may occur, an additional, or second handshake, may make use of TLS extended messages 64 described in RFCs 4680 and 5878 to facilitate the exchange of SupplementalData messages. The TLS client 40 and the TLS server 42 may, in this manner, perform the second handshake operation in order to indicate support for a server SupplementalData message 70 and a client SupplementalData message 68 having certain types of authorization data or other data suitable to facilitating the contemplated authentication.

The server 34 can initiate the second handshake by sending a HelloRequest 64 such that the second handshake may include server's support for authz extensions which will result in SupplementalData 68 having the DTCP certificate being exchanged. Optionally, the second handshake may be initiated in response to a renegotiate message 62 originating from the client TLS application layer 38. The TLS client 40 and the TLS server 42 may then exchange ClientHello and ServerHello messages 64 as defined in the TLS RFCs. The ClientHello and ServerHello messages 64 may be characterized as extended Hello messages when used to confirm that both parties support certain authorization data. The ClientHello message, which may be referred to as a first Hello message, may be transmitted from the client to indicate support for client_authz and server_authz extensions. The client_authz and the server_authz extensions may include extension_data fields for specifying authorization data acceptable for exchange. The TLS client 40 transmitted client_authz and server_authz extensions may be used to indicate the format of the authorization data that will be sent in a client SupplementalData message 68 to the TLS server 42. The TLS server 42 transmitted client_authz and server_authz extensions may be used to indicate the format of the authorization data that will be sent in a server SupplementalData message 70 to the TLS client 40.

RFC 5878 defines the client_authz and server_authz extensions respectively require client and server X.509 and/or SAML certificates to be carried as the authorization data within the corresponding SupplementalData messages 68, 70. The present invention contemplates associating a DTCP extension_data field with the client_authz and server_authz extensions to facilitate exchanging DTCP authorization data (dtcp_authz_data), i.e., DTCP certificates, within the corresponding client and server SupplementalData messages 68, 70. In this manner, the present invention contemplates facilitating use of TLS SupplementalData messages to exchange DTCP certificates. Optionally, the messages may also be used to exchange X.509 and/or SAML certificates depending on whether the extension_data field specified within the client authorization and server_authz extensions identify the use thereof.

The present invention contemplates registering the DTCP authorization type in the TLS authorization data as dtcp_authorization, e.g., by registering the dtcp_authorization with the Internet Assigned Number Authority (IANA) registry. The DTCP Authorization data may be sent in the authz_data message when the authorization data type is dtcp_authorization. The syntax of the dtcp_authorization data may be:

```
struct {
    opaque random_bytes[32];
} RandomNonce;
digitally-signed struct {
    RandomNonce nonce;
    opaque DTCPCert<1..2^24−1>;
    opaque ASN.1Cert<0..2^24−1>;
} DigitallySignedData;
struct {
    DigitallySignedData certs;
    opaque signature[40];
} dtcp_authz_data;
```

The RandomNonce 72 may consist of 32 bytes generated by a secure random number generator. The dtcp_authz_data message may contain a RandomNonce received from the server.

If the ASN.1 Certificate is being sent in the structure above, it may be the same as the sender's certificate that will be sent in the Certificate or ClientCertificate message.

The DigitallySigned may contain the DTCP Certificate of the client 32 (e.g., DTCP certificate 20) and the optional ASN.1 Certificate followed by the digital signature generated using a private key associated with the client 32. The client TLS application layer 38 may encrypt the DTCP certificate using an Elleptic Curve Digital Signature Algorithm (EC-DSA) with the television private key. If the sender is sending its own DTCP Certificate, it may populate the certs field.

The server SupplementalData message 70 may be transmitted from the TLS client 40 to the client TLS application layer 38 for processing. The client TLS application 38 may recover the RandomNonce or other parameter added with the server 34, illustrated as an SD payload 74. (Optionally, use of the RandomNonce may be omitted if the enhanced security provided by its use is unnecessary.) In cooperation with recovering the RandomNonce 72, the TLS client 40 may verify a server X.509 certificate transmitted from the server 34 as part of the second handshake operation. The X.509 certificate, or other server transmitted certificate, may be used to verify integrity of the server 34 prior to subsequently transmitting the client DTCP certificate within the client SupplementalData message 68. The TLS client 40 may communicate with a suitable authentication server to verify the server X.509 certificate. Once verified, the client TLS application layer 38 may generate another SD payload 76 for packaging and transmission by the TLS client 40 within the client SupplementalData message 68. The client SD 76 may be generated by concatenating the RandomNonce with the client DTCP certificate and thereafter encrypting the concatenation with the private key assigned to the client.

The TLS server 42 may receive the client SupplementalData message 68 and recover the client DTCP certificate by processing (decrypting/verifying) the client SD 76 using a public key associated with the client. The TLS server may then forward a SD message 78 having the client DTCP to the server TLS application layer 44. The server 34 may then verify the client DTCP certificate with a suitable authentication entity. If the client DTCP certification is unverified, establishment of the second TLS tunnel 54 may be aborted. If the client DTCP certificate is verified, the second TLS tunnel 54 may be established. Once established, the security inherent in the second TLS tunnel 54 may be used to secure passage of additional authentication information between the server 34 and the client 32. The second TLS tunnel 54, for example, may be used for the authentication server 16 (server) to provide a token, an entitlement or other information to the television 12 (client) for use in facilitating access to content. The authentication information may be subsequently passed from the television 12 to the content server 14 to facilitate transmission or access to the desired content/services.

If the server 34 does not possess a trusted X.509 certificate and wishes to authenticate itself using its DTCP certificate, then the method shown in FIG. 2 can be modified. This may be accomplished by augmenting transmission of the server X.509 certificate transmitting the RandomNonce and a server DTCP certificate of the server within the server SupplementalData message 70. Optionally, the payload of the server SupplementalData message may recover the RandomNonce and the server DTCP Certificate using the private key associated with a self-signed X.509 certificate of the server. This process for facilitating authentication without requiring the server to obtain a X.509 certificate may be beneficial at least in that it allows a desired level authentication to be achieved utilizing DTCP certificates provided to the client and the server. As noted above, the present invention is not necessarily limited to facilitating authentication solely using DTCP certificates. The present invention contemplates facilitating similar authentication using other parameters, such as but not necessary limited to use of a DH parameter, such as but not necessarily limited to that described in U.S. Pat. No. 4,200,770, the disclosure of which is hereby incorporated by reference in its entirety.

Figure 3:
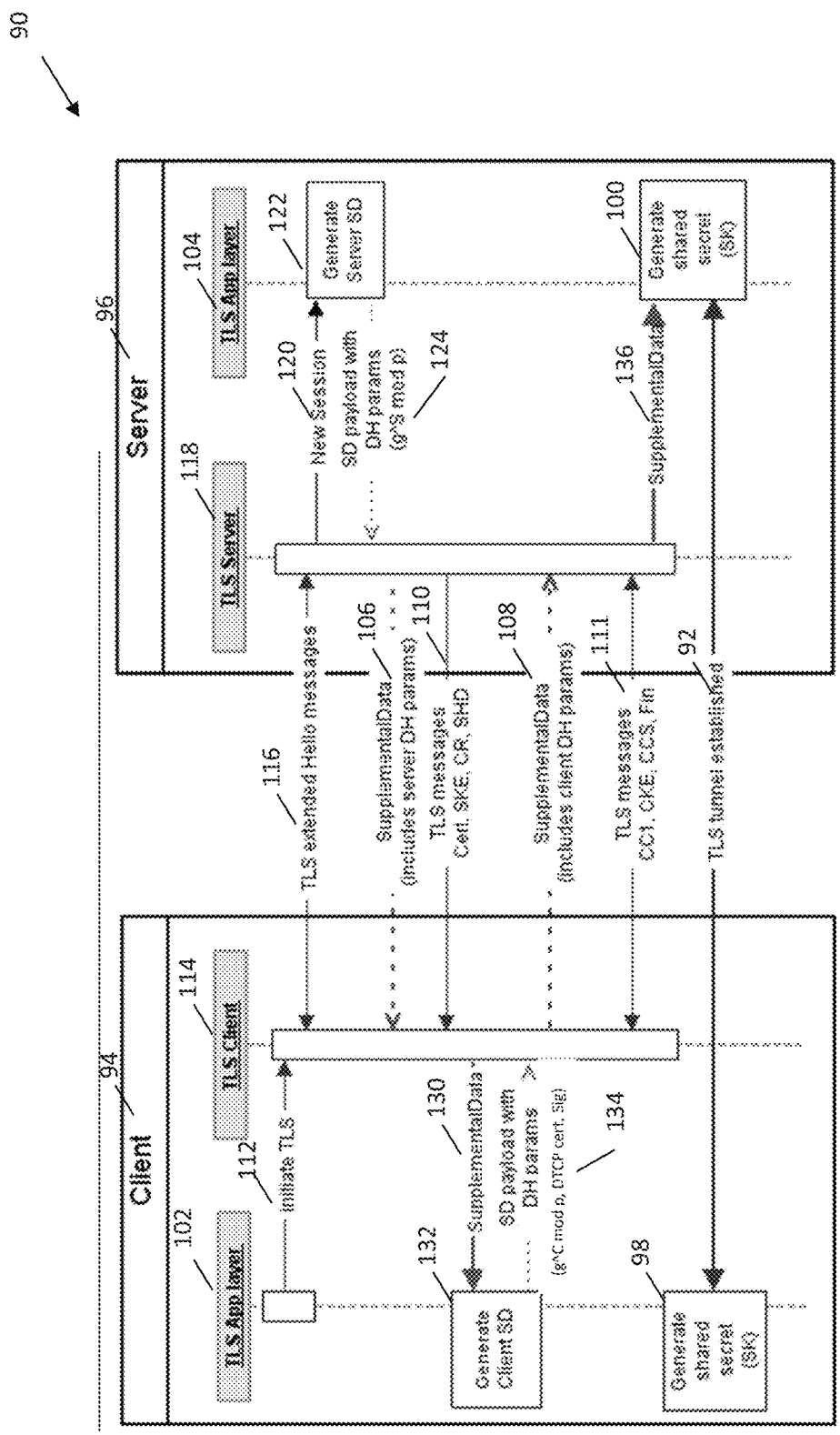
FIG. 3 illustrates a flowchart of a DH-based method for authentication in accordance with one non-limiting aspect of the present invention.

FIG. 3 illustrates a flowchart 90 of a DH-based method for authentication in accordance with one non-limiting aspect of the present invention. The DH-based method is illustrated with respect to a single-handshake operation where a single TLS tunnel 92 is established between a client 94 and a server 96 to facilitate mutual authentication using a shared secret, which may be respectively generated with shared secret processes 98, 100 associated with a client TLS application layer 100 and a server TLS application layer 104. The shared secret may then be used to encrypt data that is exchanged between the client 94 and the server 96 within the tunnel 92. As described below in more detail, the DH-based authentication may rely upon the use of DH parameters to facilitate additional security, such as by providing additional security for in addition to that described with respect to use of DTCP certificates.

The DH-based authentication may rely upon the TLS messaging described above to facilitate transporting particularly defined payloads within SupplementalData messages 106, 108. Accordingly, the nomenclature used above with respect to FIG. 2 may correspond with similarly configured messages 110, 111, unless otherwise noted, to facilitate the DH-based authentication described with respect to FIG. 3. The DH-based authentication may correspond with the client TLS application layer 102 issuing an initiate TLS message 112 to a TLS client 114. The TLS client 114 may then exchange extended Hello messages 116 with a TLS server 118. The TLS server 118 may communicate a New Session message 120 to the server TLS application layer 104. The server TLS application layer 104 may process the New Session message 120 with a generator 122 to produce a server SupplementalData message payload (SD) 124. The server SD 124 may include DH parameters, and optionally the server X.509 certificate. The DH parameters may be defined as (g^S mod p) where S is a random secret generated with the server 96 and g, p are known to the client 94 and the server 96, such as based on registry of the dtcp_authorization and/or as a function of other messages exchanged between the client 94 and the server 96 or a third party.

The TLS server 118 may transmit the server SupplementalData message 106 having the DH parameters to the TLS client 114. The TLS client 114 may transmit a message 130 to the client TLS application layer 102 for use with a generator 132 in generating a client SupplementalData payload (SD) 134. The client SD 134 may be generated by the TLS application layer 102 processing additional DH parameters. The client DH parameters may correspond with (g^C mod p) where C is a random secret generated with the client and g,p are known values to the client 94 and the server 96. The client DH parameters may then be associated or concatenated with the client DTCP certificate, and optionally signed with a EC-DSA Signature using private key of the client 94. The client SD 134 may be added to the client SupplementalData message 108 transmitted from the TLS client 114 to the TLS server 118. The TLS server 118 may transmit a corresponding message 136 to the TLS application layer 104 to process the client SupplementalData.

The server TLS application layer 104 may recover the client DTCP certificate from the client SupplementalData message 108, and based thereon, verify the client 94. The client 94 is verified, the TLS tunnel 94 may be established to facilitate secure transmission of information between the client 94 and the server 96. The client shared secret generator 98 and the server shared secret generator 100 may respectively process the client DH parameters and the server's DH parameters in order to generate corresponding a client shared secret and a server shared secret. The client shared secret may be generated as {(g^S mod p)^C mod p}. The server shared secret may be generated as {(g^C mod p)^S mod p}. According to DH security, the server shared secret and the client shared secret should produce the same values if the corresponding information was properly generated and shared. The server shared secret and the client shared secret may then be used to encrypt or otherwise secure transmissions respectively originating from the server 96 and the client 94. The shared secret encrypted information may then be recovered at the client 94 using the client shared secret and at the server 96 using the server shared secret in the event the server and client shared secrets are the same. In this manner, the client and server shared secrets may be used to additionally secure information transmitted within the secured TLS tunnel 92.

As supported above, one non-limiting aspect of the present invention contemplates method to pass device authentication credentials utilizing the TLS Supplemental Data field. This implementation may provide a device authentication service simultaneous to the establishment of a TLS secure link. TLS may be used to provide an extension mechanism by which certain extensions to base message types can be registered and used. One such extension is for the Hello message extension with HandshakeType for Supplemental Data. This extension allows the TLS client and server to exchange arbitrary and opaque data as part of the TLS handshake. To ensure that the supplemental data is exchanged over a secure channel, TLS Handshake protocol allows a mechanism of renegotiation whereby either the client or server can renegotiate the handshake with alternate parameters once an initial secure channel is already established. The expectation is that the supplemental data is to be processed by the application using TLS. Also the supplemental data format (SupplementalDataType) can be registered with IANA through an IETF Consensus. One such registered SupplementalDataType is the authz_data. We may be able to use this to perform client capability exchange.

One non-limiting aspect of the present invention facilitates authentication of a client that possesses a non-X.509 credential (e.g. DTCP certificate) by sending that credential and additional security information in the SupplementalData ExtensionType specified in the client_authz Hello extension. Authentication of a server that possesses a non-X.509 credential (e.g. DTCP certificate) may also be accomplished by using a self-signed X.509 certificate that is cryptographically tied to the non-X.509 credential and sending that information in the SupplementalData ExtensionType specified in the server_authz Hello extension. Optionally, one application of the present invention may include the DTCP certificates being a DTLA credential as issued by Digital Living Network Alliance (DLNA) for CVP-2.

As supported above, the present invention contemplates the dtcp_authorization optionally being used in cooperation with or as part of the TLS extended Hello messaging. The client TLS server may include both the client_authz and server_authz extensions in the extended client hello message when indicating its desire to exchange DTCP authorization data with the server. Additionally, the client may use the dtcp_authorization in the extension_data field to specify the format of the authorization data. A client may receive the server's dtcp_authz_data before it sends its own dtcp_authz_data. When sending its own dtcp_authz_data message, the client may use the same RandomNonce that it receives in the server's dtcp_authz_data message. A client may include its ASN.1 Certificate in the certs field to cryptographically tie its dtcp_authz_data with the TLS session being established. The TLS server may respond with both the client_authz and server_authz extensions in the extended server hello message when indicating its desire to exchange dtcp_authorization data with the client. Additionally the server may use the authorization data type specified in dtcp_authorization in the extension_data field to specify the format of the dtcp_authorization data. A server may generate and populate the RandomNonce in the dtcp_authz_data message. If the client's hello message does not contain both the client_authz and server_authz extensions with dtcp_authorization type, the server may not include support for dtcp_authorization data in its hello message. A server may include its ASN.1 Certificate in the certs field to cryptographically tie its dtcp_authz_data with the TLS session being established.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for authenticating a first device to a second device comprising:
   generating a nonce at a server operating independently of the first and second devices, the nonce being previously unknown to the first and second devices;
   encrypting the nonce at the server using a private key associated with the first client;

transmitting a ServerHello message from the server to the first device in response to the server receiving an authentication request from the first device, the ServerHello message including the nonce as encrypted by the server using the private key associated with the first device;

processing at the server a SupplementalData message received from the first device in response to the ServerHello message, the SupplementalData message including a certificate associated with the first device and the nonce as decrypted by the first device;

determining at the server the certificate recovered from the SupplementalData message to be one of verified and unverified; and transmitting a token from the server to the first device when the certificate is verified, the token being sufficient for authenticating the first device to the second device.

2. The method of claim 1 further comprising using a public key of the first device at the server to decrypt an encrypted portion of the SupplementalData message in order to recover the certificate and the nonce therefrom, the first device encrypting the certificate and the nonce within the encrypted portion using the private key.

3. The method of claim 2 further comprising de-concatenating the encrypted portion at the server to separate the nonce from the certificate, the first device concatenating the nonce with the certificate prior to encrypting into the encrypted portion.

4. The method of claim 1 further comprising establishing a Transport Layer Security (TLS) tunnel between the first device and the server when exchanging the SupplementalData message and the token.

5. The method of claim 1 further comprising the server and the first device indicating support for client_authz and server_authz extensions, including specifying use of the certificate within the client_authz and server_authz extensions.

6. The method of claim 5 further comprising identifying use of the certificate within an extension_data of the client_authz and server_authz extensions.

7. The method of claim 1 further comprising the server transmitting to the first device a Certificate message having an X.509 certificate, the first device verifying the X.509 certificate prior to transmitting the SupplementalData message to the server.

8. The method of claim 1 further comprising the server randomly generating the nonce using a random number generator such that, when coupled with the nonce being encrypted at the server with the private key, security is enhanced due to recovery of the nonce from the ServerHello message being limited to the first device or other devices having access to the private key associated with the first device and/or another device having access to the random number generator.

9. The method of claim 1 further comprising the server randomly generating the nonce using a random number generator to facilitate detecting replay attacks.

10. The method of claim 1 further comprising the certificate being a Digital Transmission Content Protection (DTCP) certificate.

11. A method of authenticating a first device utilizing Transport Layer Security (TLS) protocol comprising:
generating a nonce with a random number generator;
encrypting the nonce with a private key associated with the first device;

transmitting a first hello message to the first device in response to issuance of an authentication request, the first hello message being transmitted according to the TLS protocol and including the nonce as encrypted with the private key; and processing a SupplementalData message transmitted according to the TLS protocol from the first device in response to the first hello message, the supplemental data message including a certificate and the nonce as decrypted by the first device; and determining to either authenticate or not authenticate the first device as a function of the certificate and the nonce retrieved from the SupplementalData message.

12. The method of claim 11 further comprising:
transmitting a token to the first device when the certificate and the nonce is verified, the token being sufficient for the first device to use in a subsequent authentication with a second device.

13. The method of claim 11 further comprising:
transmitting the first hello message to the first device in response to receiving a second hello message from the first device; and
indicating within the first and second hello messages corresponding support for client_authz and server_authz extensions used with the TLS protocol.

14. The method of claim 11 further comprising de-concatenating the certificate from the nonce when processing the Supplemental Data message, the first device having previously concatenated the certificate with the nonce in a concatenation, the concatenation being included the SupplementalData message.

15. The method of claim 14 further comprising decrypting the concatenation using a public key associated with the first device prior to the de-concatenating.

16. The method of claim 11 further comprising the certificate being a Digital Transmission Content Protection (DTCP) certificate.

17. A method for authenticating a first device comprising:
processing an encrypted portion of a SupplementalData message transmitted from the first device according to the Transport Layer Security (TLS) protocol, including retrieving a certificate included therewith, the certificate attesting to authentication of the first device without being any one of a X.509 certificate, X.509 attribute certificate (AC) or a Security Assertion Markup Language (SAML) certificate;

transmitting a token to the first device when the certificate retrieved from the supplemental data message is verified, the token being sufficient for authenticating the first device to a second device for purposes of accessing content available therefrom; and transmitting the token from a server to the first device, the server receiving the supplemental data message from the first device and determining whether the certificate is verified.

18. The method of claim 17 further comprising:
recovering a nonce included within the SupplementalData message, the nonce having been previously transmitted to the first device within a hello message, the hello message having the nonce encrypted according to a private key associated with the first device; and
requiring the nonce included in the supplemental data message to match the nonce included within the hello message before permitting verification of the certificate.

19. The method of claim 18 further comprising randomly generating the nonce prior to encryption within the hello message.

* * * * *